United States Patent
Ito

(10) Patent No.: US 10,121,285 B2
(45) Date of Patent: Nov. 6, 2018

(54) VEHICLE DISPLAY DEVICE

(71) Applicant: DENSO CORPORATION, Kariya, Aichi-pref. (JP)

(72) Inventor: Hideki Ito, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/767,007

(22) PCT Filed: Dec. 19, 2013

(86) PCT No.: PCT/JP2013/007454
§ 371 (c)(1),
(2) Date: Aug. 11, 2015

(87) PCT Pub. No.: WO2014/125546
PCT Pub. Date: Aug. 21, 2014

(65) Prior Publication Data
US 2015/0379776 A1    Dec. 31, 2015

(30) Foreign Application Priority Data

Feb. 12, 2013  (JP) ................................ 2013-024778

(51) Int. Cl.
*G06T 19/00*    (2011.01)
*B60K 35/00*    (2006.01)
(Continued)

(52) U.S. Cl.
CPC ............ *G06T 19/006* (2013.01); *B60K 35/00* (2013.01); *B60K 37/02* (2013.01); *G01D 7/04* (2013.01);
(Continued)

(58) Field of Classification Search
None
See application file for complete search history.

(56) References Cited

U.S. PATENT DOCUMENTS 6,621,471 B1    9/2003  Ozaki et al.
2004/0246392 A1*  12/2004  Maruyama ......... G02B 27/0101
349/11
(Continued)

FOREIGN PATENT DOCUMENTS

JP    2001083913 A    3/2001
JP    2005119470 A    5/2005
(Continued)

OTHER PUBLICATIONS

International Search Report and Written Opinion (in Japanese with English Translation) for PCT/JP2013/007454, dated Apr. 1, 2014; ISA/JP.

*Primary Examiner* — Said Broome
(74) *Attorney, Agent, or Firm* — Harness, Dickey & Pierce, P.L.C.

(57) ABSTRACT

A combination meter including a first meter and a second meter, which are visible from a front side, and a half-silvered mirror disposed in front of the combination meter and having semi-transparent property are provided. Also, an image output device displays an image toward the half-silvered mirror is provided. The half-silvered mirror reflects the image displayed by the image output device to display a virtual image in front of the meter. Thus, the virtual image is overlappedly displayed with respect to the combination meter, whereby a use intuitively recognizes high priority information.

6 Claims, 4 Drawing Sheets

(51) Int. Cl.
  *G01D 7/04*   (2006.01)
  *B60K 37/02*  (2006.01)
  *G02B 27/01*  (2006.01)
  *G09G 5/10*   (2006.01)
  *G02B 27/22*  (2018.01)

(52) U.S. Cl.
  CPC ..... *G02B 27/0101* (2013.01); *G02B 27/2278* (2013.01); *G09G 5/10* (2013.01); *B60K 2350/1064* (2013.01); *B60K 2350/2056* (2013.01); *G02B 2027/014* (2013.01); *G02B 2027/0118* (2013.01); *G09G 2340/12* (2013.01); *G09G 2380/10* (2013.01)

(56) References Cited

U.S. PATENT DOCUMENTS

| | | |
|---|---|---|
| 2007/0101290 A1 | 5/2007 | Nakashima et al. |
| 2008/0161997 A1* | 7/2008 | Wengelnik ............. B60K 35/00 701/36 |

FOREIGN PATENT DOCUMENTS

| | | |
|---|---|---|
| JP | 2007121798 A | 5/2007 |
| JP | 2007121822 A | 5/2007 |
| JP | 2009075026 A | 4/2009 |
| JP | 2009192434 A | 8/2009 |
| JP | 2012037241 A | 2/2012 |

\* cited by examiner

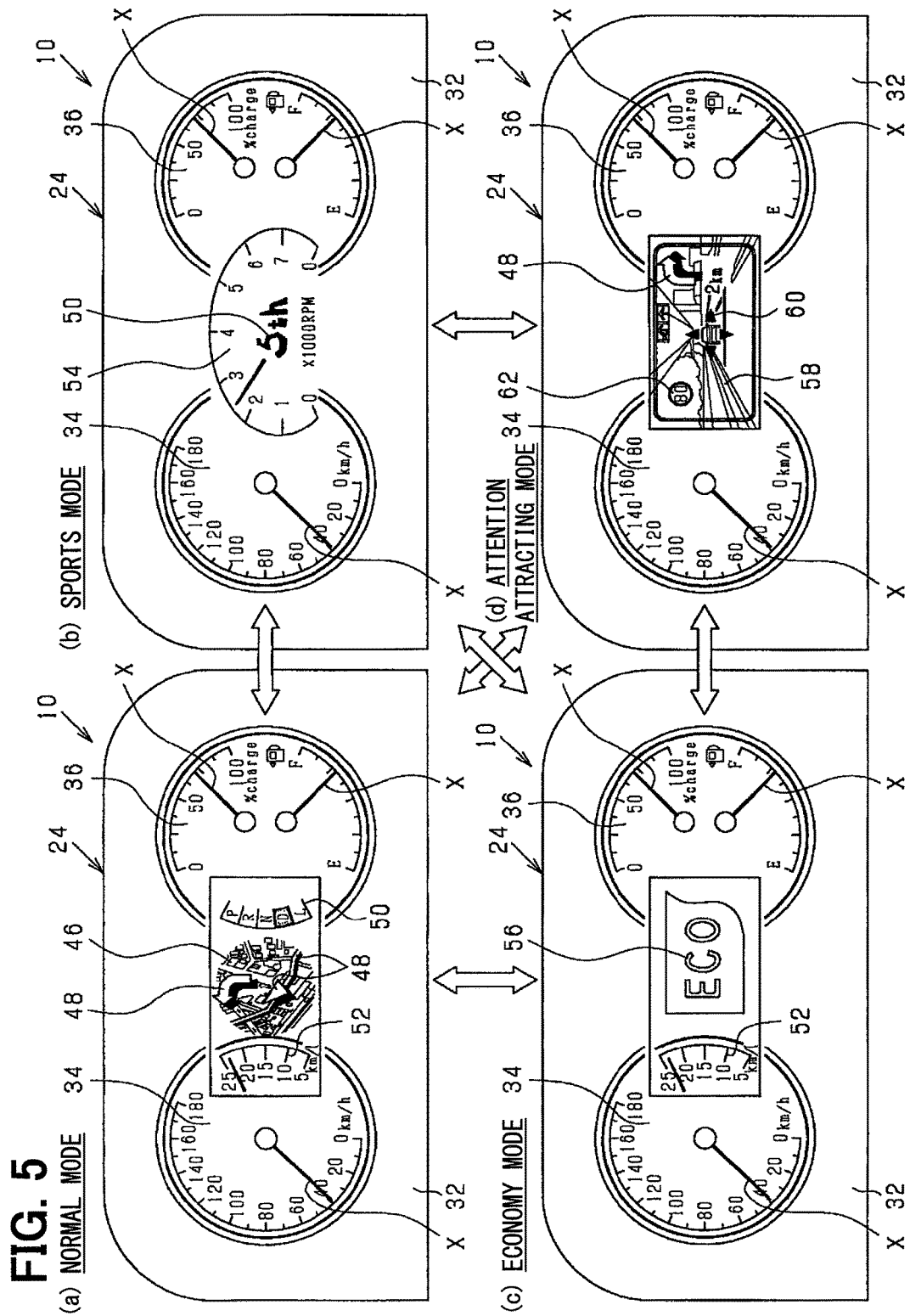

VEHICLE DISPLAY DEVICE

CROSS-REFERENCE TO RELATED APPLICATIONS

This application is a U.S. National Phase Application under 35 U.S.C. 371 of International Application No. PCT/JP2013/007454 filed on Dec. 19, 2013 and published in Japanese as WO 2014/125546 A1 on Aug. 21, 2014. This application is based on and claims the benefit of priority from Japanese patent application No. 2013-024778 filed on Feb. 12, 2013. The entire disclosures of all of the above applications are incorporated herein by reference.

TECHNICAL FIELD

The present disclosure relates to a vehicle display device including a display portion visible from a front side.

BACKGROUND ART

In a vehicle cabin, a vehicle display device having meters for a travelling speed or a revolution speed of an engine is disposed. In recent years, in addition to these meters, the vehicle display device also displays a variety of information related to traveling. For example, a vehicle display device displays navigation information, such as a map, or displays information about danger during traveling to warn a driver (refer to Patent Literature 1).

PRIOR ART LITERATURE

Patent Literature

Patent Literature 1: JP 2007-121798 A

SUMMARY OF THE INVENTION

However, in a conventional vehicle display device, since other information is displayed on the same screen of the meters, it may be difficult to recognize the priority of the information. Thus, it may be difficult for a user to rapidly determine which information the user should recognize. Especially, when much information is displayed on the vehicle display device, it may be desirable to intuitively recognize the priority of the displayed information.

The present disclosure is made to resolve the above problems and its object is to make a user possible to intuitively recognize information by displaying overlappedly a virtual image in front of a display portion.

MEANS FOR SOLVING THE PROBLEM

In a first aspect of the present disclosure, a display member including a display portion visible from a front side, a reflecting member disposed in front of the display member and having semi-transparent property, and an image output device displaying an image toward the reflecting member are provided, and the reflecting member reflects the image displayed by the image output device to display a virtual image in front of the display member.

According to the first aspect, since the virtual image of the image output device, which was reflected by the reflecting member, is overlappedly displayed in front of the display portion of the display member, much information can be displayed. Since the virtual image is displayed to project forward with respect to the display portion, a user can primarily recognize the information. Thus, when the image output device displays an image with important information, the user can primarily recognize the information. In other words, the user can intuitively recognize high priority information from among much information.

Further, since the virtual image, which was reflected by the reflecting member, is displayed in front of the display portion and thus a plurality of images are stereographically and overlappedly displayed, display performance can be enhanced.

In a second aspect of the present disclosure, a light emitting element illuminating the display portion, and a controller controlling light emission behavior of the light emitting element are provided, and the controller controls the light emitting element such that a portion of the display portion, with which the virtual image is overlapped in a front-rear direction, becomes darker than a portion of the display portion, with which the virtual image is not overlapped in the front-rear direction.

According to the second aspect, lightning of the light emitting element is controlled such that a portion of the display portion, with which the virtual image is overlapped in a front-rear direction, becomes darker than a portion, with which the virtual image is not overlapped in the front-rear direction. Thus, when the virtual image is displayed to be overlapped with the display portion, the contents of the virtual image can be clear displayed. Hence, a user can surely recognize the information displayed in the virtual image.

BRIEF DESCRIPTION OF THE DRAWINGS

FIG. 5 is a front view illustrating a display pattern at each display mode.

EMBODIMENTS FOR CARRYING OUT INVENTION

Next, a vehicle display device 10 according to the embodiment will be described below. In the embodiment, one example of the vehicle display device 10 will be described, in which the vehicle display device 10 is applied to a hybrid vehicle (hereinafter, merely referred to as "vehicle") using driving power from both an engine and a motor (both of which are not shown).

Figure 1:
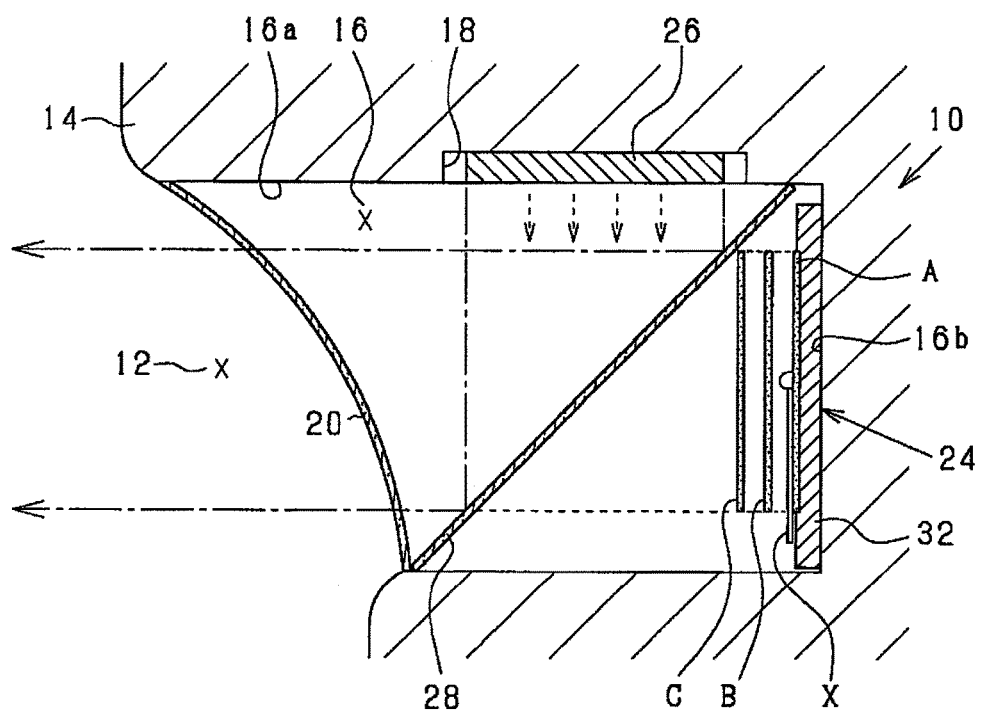
FIG. 1 is a main portion of a vehicle display device according to an embodiment.

FIG. 1 shows a cross-sectional view schematically illustrating the vehicle display device 10 according to the present embodiment. A storage chamber 16 is formed in an instrument panel 14, which is disposed in a cabin 12 of the vehicle, at a position facing a driver seat. The storage chamber 16 is formed into a box shape opening toward the cabin 12. The main components of the vehicle display device 10 are disposed inside the storage chamber 16. An installation space 18 is recessed from a top surface 16a of the storage chamber 16 and the installation space 18 is open downward.

An opening of the storage chamber 16 is covered by a light-transmitting member 20 having a curved cross section. A user is capable of visually recognizing, through the light-transmitting member 20, information displayed by the vehicle display device 10. An operation member 22 (refer to FIG. 2) is disposed in the instrument panel 14 and the operation member 22 is manipulated when switching a display mode as described below. The operation member 22 includes, e.g., an operation panel, such as a touch panel, an operation lever, and a dial switch.

Figure 2:
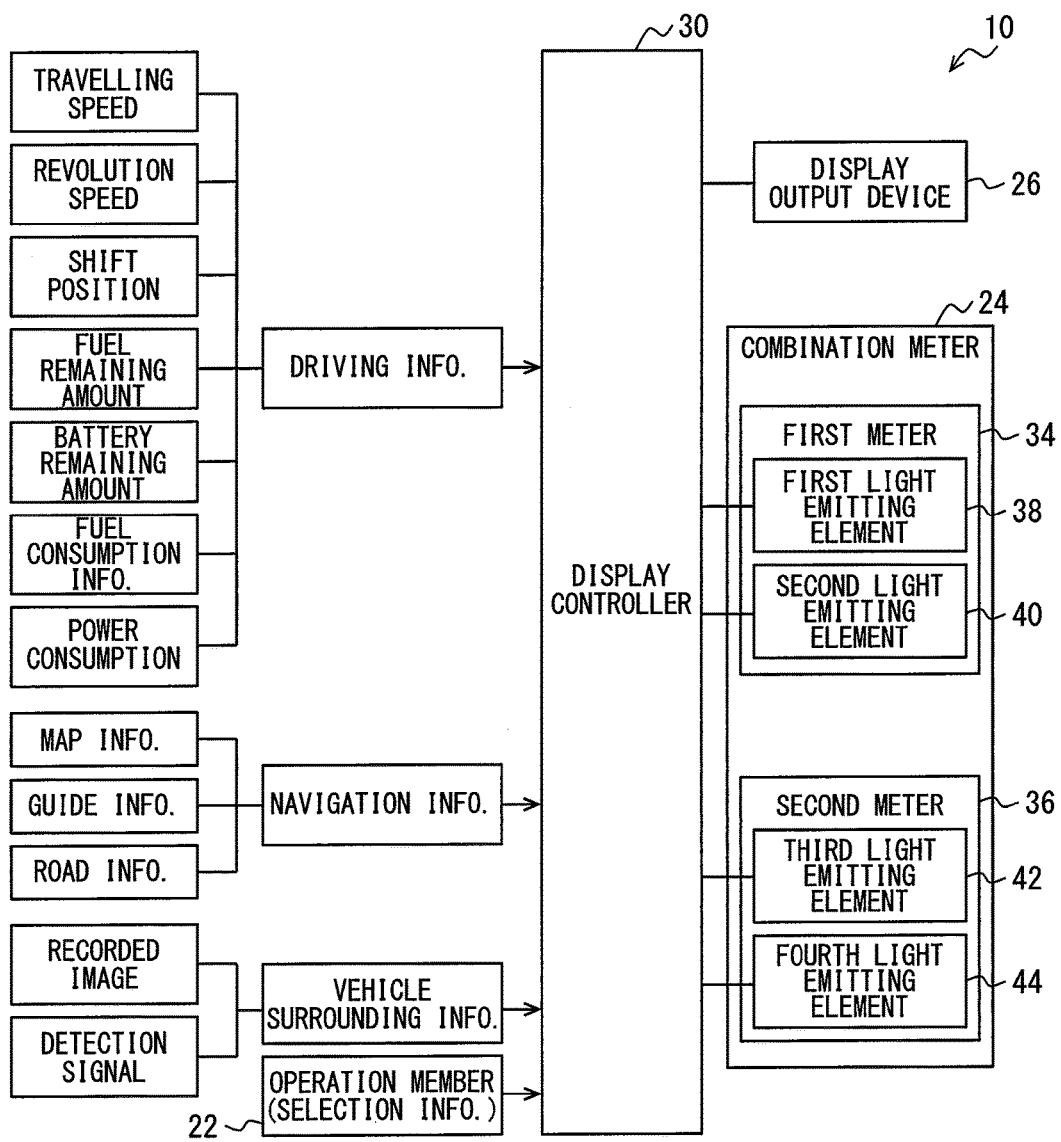
FIG. 2 is a block diagram of a control configuration of the vehicle display device according to the embodiment.

The vehicle display device 10 includes an analog-type combination meter 24 (display member), an image output device 26, and a half-silvered mirror 28 (reflecting member). As shown in FIG. 2, the vehicle display device 10 also includes a display controller 30 (controller) that totally controls light emission behavior.

The combination meter 24 is attached to a facing surface 16b of the storage chamber 16 that faces toward the cabin 12, and the combination meter 24 is so arranged as to face toward the cabin 12 in a horizontal direction. It should be noted that a direction in which the combination meter 24 faces is referred to as a front side (the left direction in FIG. 1) and the opposite direction is referred to as a rear side. That is, the combination meter 24 is viewed by a user (a driver) from the front side.

Figure 3:
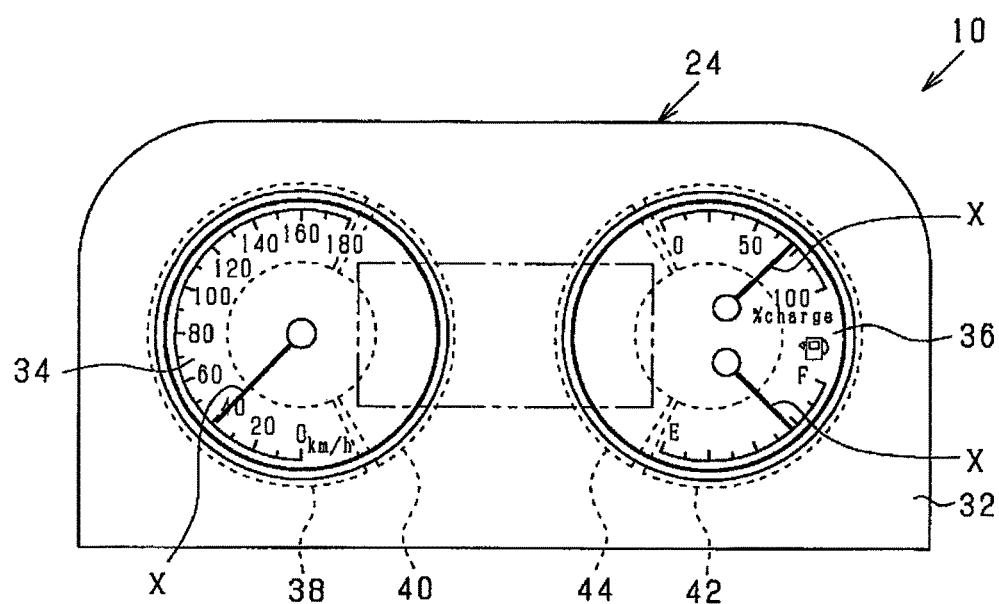
FIG. 3 is a front view of a combination meter viewed from a user.

As shown in FIG. 3, the combination meter 24 includes a main panel 32 having a plate shape and a plurality of tachometers 34, 36 (display portion) disposed on a front surface (hereinafter "board surface") of the main panel 32. The main panel 32 has a shape elongated along one direction (the right-left direction viewed from the user). Two tachometers 34, 36 are disposed to be spaced away from each other along the longitudinal direction of the main panel 32.

One of the tachometers (referred to as "first meter 34") is a speed meter including a traveling speed and a pointer X that are displayed on the board surface. The other of the tachometers (referred to as "second meter 36") includes a battery meter (an upper side in FIG. 3) and a fuel meter (a lower side in FIG. 3). The battery meter includes a charge remaining amount of a battery and a pointer X that are displayed on the board surface. The fuel meter includes a remaining amount of fuel (gasoline) and a pointer X that are displayed on the board surface.

As shown in FIGS. 2 and 3, the combination meter 24 includes a first to a fourth light emitting element 38, 40, 42, 44 (light emitting element) that illuminates the first meter 34 or the second meter 36. The first to the fourth light emitting element 38, 40, 42, 44 is formed of a light emitting body such as an LED. The first to fourth light emitting elements 38, 40, 42, 44 are disposed in a rear side of the board surface of the main panel 32. The first to fourth light emitting elements 38, 40, 42, 44 emit light from the rear side of the first meter 34 and the second meter 36 to illuminate both the meters 34, 36.

As shown in FIG. 3, the first light emitting element 38 is arranged into a curved shape that corresponds to a portion of the first meter 34 on which the traveling speed is displayed. The second light emitting element 40 is arranged into a curved shape that corresponds to a portion of the first meter 34 on which the traveling speed is not displayed.

The third light emitting element 42 is arranged into a curved shape that corresponds to a portion of the second meter 36 on which the battery meter and the fuel meter are displayed. The fourth light emitting element 44 is arranged into a curved shape that corresponds to a portion of the second meter 36 on which the battery meter and the fuel meter are not displayed.

The image output device 26 is disposed inside the installation space 18 of the storage chamber 16. The image output device 26 is housed inside the installation space 18, and thus the image output device 26 is invisible from the user. A display surface of the image output device 26 faces downward along a vertical direction. In other words, the direction in which the combination meter 24 faces is perpendicular to the direction in which the image output device 26 faces.

The image output device 26 is a 3-D display device capable of displaying a 3-D image. The image output device 26 is capable of overlappedly displaying a variety of information on a plurality of layers that are positioned different from each other. In the present embodiment, three layers (a first layer A, a second layer B, a third layer C) are defined, and an image having different contents is displayed on each layer A, B, C. The image output device 26 displays a 3-D image (3-D displaying) or overlappedly displays 2-D images according to the display mode as described below. Each layer (the first layer A, the second layer B, the third layer C) is conceptually introduced into the image output device 26, and thus a user cannot visually recognize these layers A, B, C. That is, a user visually recognizes images on each layer A, B, C (i.e., a virtual image as described below) that are displayed from the image output device 26.

The half-silvered mirror 28 is disposed in front of the combination meter 24 and downward of the image output device 26. The half-silvered mirror 28 is arranged to be inclined upward from the opening of the storage chamber 16 toward the combination meter 24. The inclination angle of the half-silvered mirror 28 is set to be about 45° relative to the horizontal surface.

The half-silvered mirror 28 has semi-transparent property that reflects a portion of incident light and allows a portion of the incident light to transmit therethrough. Thus, a user can visually recognize the first meter 34 and the second meter 36 of the combination meter 24 through the half-silvered mirror 28. The half-silvered mirror 28 reflects an image displayed by the image output device 26. The image of the image output device 26 reflected by the half-silvered mirror 28 is displayed in front of the combination meter 24 as a virtual image. Hence, a user can visually recognize the virtual image displayed in front of the combination meter 24.

As shown in FIG. 3, a region where the virtual image by the half-silvered mirror 28 is displayed is positioned between the first meter 34 and the second meter 36 such that the region overlaps with portions of both meters 34, 36 (refer to double-dashed line in FIG. 3). The positions where the virtual image of the half-silvered mirror 28 is overlapped with the first meter 34 and the second meter 36 correspond to positions where the second light emitting element 40 and the fourth light emitting element 44 are disposed. In other words, the second light emitting element 40 and the fourth light emitting element 44 are positioned to correspond to the areas of the first meter 34 and the second meter 36 where the virtual image overlaps with the meters 34, 36.

Figure 4:
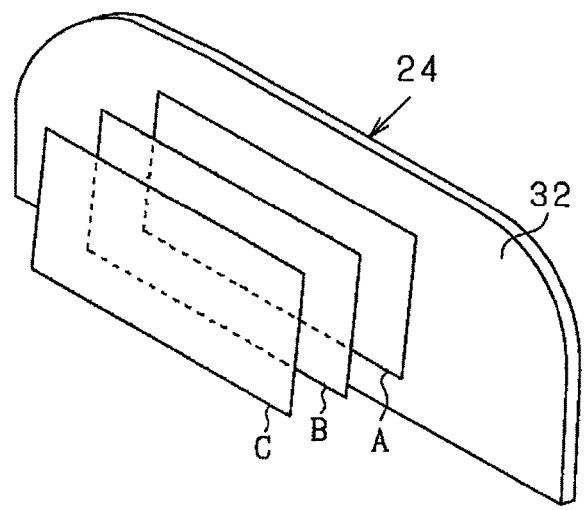
FIG. 4 is a schematic diagram illustrating virtual images overlappedly displayed in front of the combination meter.

As shown in FIG. 4, when the image output device 26 performs the overlapped display, an image for each layer A, B, C is reflected by the half-silvered mirror 28 and is displayed at a position different from each other in the front-rear direction. As shown in FIG. 1, the virtual image on the first layer A is displayed on the board surface of the combination meter 24 (the same position in the front-rear direction). The virtual image on the second layer B is displayed at a front position that is spaced away from the first layer A by a specified distance. The virtual image on the third layer C is displayed at a front position that is spaced away from the second layer B by a specified temperature.

That is, a protruding amount of each virtual image of the first layer A, the second layer B and the third layer C from the combination meter 24 (i.e., a spaced distance) becomes large in this order. Thus, the virtual image of the third layer C is displayed at the nearest position to a user. The distance between the first layer A and the second layer B is set to be substantially the same as the distance between the second layer B and the third layer C (refer to FIG. 1).

When the image output device 26 displays a 3-D image, the 3-D image is reflected by the half-silvered mirror 28 and then a 3-D virtual image is displayed in front of the combination meter 24.

[Control Configuration]

Next, the control configuration of the vehicle display device 10 will be described with mainly reference to a block diagram of FIG. 2. The display controller 30 executes image control to the image output device 26 and light emission control to the first to the fourth light emitting elements 38, 40, 42, 44. The display controller 30 is made of an electric control unit including a CPU, a ROM, a RAM or the like, which are not shown.

[Image Control]

A variety of information such as driving conditions of the vehicle is output to the display controller 30, and the display controller 30 controls display contents and a display pattern by the image output device 26 based on the information. More specifically, driving information indicating driving conditions of the vehicle, navigation information related to navigation, vehicle surrounding information related to a vehicle surrounding, and selection information from a user are input to the display controller 30. The display controller 30 determines the contents to be displayed by the image output device 26 and light emission behavior of the first to the fourth light emitting elements 38, 40, 42, 44.

As the driving information, information indicating basic driving conditions of the vehicle, such as the current revolution speed of the engine, a travelling speed of the vehicle, a shift position or the like, may be included. Further, the fuel remaining amount in the vehicle, the battery remaining amount, and the total power amount currently consumed at, e.g., an air conditioner (power consumed amount) are also input to the display controller 30 as the driving information. Furthermore, a fuel consumption rate (fuel consumption information) calculated based on the current revolution speed of the engine and the traveling speed is also included as the driving information.

Map information stored in a storage medium, such as a hard disk or a DVD-ROM, that is mounted to the vehicle and guide information for guiding a course from the current place to a destination are included as the navigation information. Also, the navigation information includes road information such as a regulation speed of a road or one-way traffic regulation.

The vehicle surrounding information may include a recorded image of the vehicle surrounding (e.g., the front side in the traveling direction) that is recorded by a surveillance camera (not shown) installed in the vehicle. Further, the vehicle surrounding information includes a detection signal from a detection sensor (not shown) that detects an object (e.g., other vehicles or pedestrians) 360° around the vehicle. The detection sensor can detect the distance from an object. If the object is other vehicle, the detection sensor can detect the distance between the other vehicle and the vehicle.

The selection information is information indicating the display mode selected by a user by manipulating the operation member 22. In the present embodiment, four kinds of modes, a normal mode indicating a normal driving condition, a sport mode indicating an engine accelerated condition, an economy mode indicating a fuel economy condition and an attention attracting mode attracting an attention for safe driving, are set as the display mode. A user can select one of the four modes by manipulating the operation member 22.

[Light Emission Control]

Next, the light emission control to the light emitting elements by the display controller 30 will be described. The display controller 30 controls all first to fourth light emitting elements 38, 40, 42, 44 to emit light when the image output device 26 does not display an image. That is, as shown in FIG. 3, when the virtual image of the image output device 26 is not displayed, all light emitting elements 38, 40, 42, 44 illuminate the entire region of the first meter 34 and the second meter 36. Accordingly, a user can visually recognize the entire region of the first meter 34 and the second meter 36.

Whereas, when the image output device 26 displays an image, the display controller 30 controls the first to the fourth light emitting elements 38, 40, 42, 44 such that portions of the first meter 34 and the second meter 36, with which the virtual image of the image output device 26 overlaps, becomes darker than portions of the first meter 34 and the second meter 36, with which the virtual image of the image output device 26 does not overlap.

Specifically, the portions of the first meter 34 and the second meter 36, with which the virtual image overlaps, become relatively dark by turning off the second light emitting element 40 and the fourth light emitting element 44. As a result, the portions of the first meter 34 and the second meter 36, with which the virtual image overlaps, can be made hard to be seen from a user.

[Display Pattern of Each Display Mode]

Next, a concrete display pattern of each display mode will be described. Contents to be displayed by the image output device 26 are predetermined in the display controller 30 for each display mode selected. When one of the display modes is selected, the image output device 26 is operated to display the contents corresponding to the selected display mode.

FIG. 5 shows the concrete display pattern of each display mode. In the normal mode, an image based on the navigation information and the driving information is displayed. As the navigation information, the map information 46 and the guide information 48 (a direction, a route, current place) are displayed. As the driving information, the shift position 50 and the fuel consumption information 52 are displayed.

The display controller 30 correlates the map information 46 with the first layer A and the guide information 48 with the second layer B. Thus, the virtual image of the map information 46 is displayed at the same position as the first meter 34 and the second meter 36 in the front-rear direction. The virtual image of the map information 46 is displayed between the first meter 34 and the second meter 36. The virtual image of the guide information 48 is displayed in front of the map information 46 at a position where the virtual image overlaps with the map information 46 in the front-rear direction, such that the virtual image projects toward a front side (toward a user) from the map information 46.

The fuel consumption information 52 and the shift position 50 are displayed on the second layer B. The virtual image of the fuel consumption information 52 is displayed at a position corresponding to a portion (a relatively dark portion) of the first meter 34 where the second light emitting element 40 is arranged. The virtual image of the shift position 50 is displayed at a position corresponding to a portion (a relatively dark portion) of the second meter 36 where the fourth light emitting element 44 is arranged. In other words, the virtual images of the fuel consumption information 52 and the shift position 50 are displayed at the same position as the guide information 48 in the front-rear direction where the virtual images do not interfere with the map information 46 (i.e., do not overlaps with the map information 46 in the front-rear direction).

In this way, the virtual image of the map information 46, in which a user may have relatively low interest (i.e., low priority), is displayed at a rear side in the normal mode. Whereas, the virtual image of relatively high priority information for a user, such as the guide information 48 and the fuel consumption information 52, is displayed on a front side.

In the sport mode, a tachometer image 54 indicating the revolution speed of the engine, which is the driving information, and the shift position 50 are displayed. During the sport mode, the display controller 30 operates the image output device 26 to display a 3-D image, whereby the tachometer image 54 and the shift position 50 are stereoscopically displayed. In the present embodiment, the virtual images of the tachometer image 54 and the shift position 50 are stereoscopically displayed such that the virtual images are inclined downward from a rear side to a front side (toward a user).

In the economy mode, the fuel consumption information 52 of the driving information and a green mark (hereinafter "eco-mark 56") indicating fuel-saving driving condition are displayed. The fuel-saving driving condition may be a condition where a travel distance per unit amount of fuel reaches, e.g., 20 km/l or more. During the fuel-saving driving condition, the display controller 30 operates the image output device 26 to display the eco-mark 56.

In the economy mode, the display controller 30 causes the fuel consumption information 52 to be displayed on the first layer A. The virtual image of the fuel consumption information 52 is displayed at a position corresponding to a portion of the first meter 34 where the second light emitting element 40 is arranged (a relatively dark portion). The display controller 30 causes the eco-mark 56 to be displayed on the second layer B. The virtual image of the eco-mark 56 is displayed between the first meter 34 and the second meter 36. More specifically, the virtual image of the eco-mark 56 is displayed between the first meter 34 and the second meter 36 such that the virtual image projects from both meters 34, 36 toward a front side. Since the eco-mark 56 is set on the second layer B, the virtual image of the eco-mark 56 is displayed in front of the virtual image of the fuel consumption information 52. That is, the virtual image of the eco-mark 56, in which a user may have high interest (high priority) during the economy mode, is displayed at the foremost position.

Whereas, when fuel economy deteriorates during the economy mode (e.g., when a travel distance per unit amount of fuel is equal to or less than 20 km/l), the display controller 30 does not control the image output device 26 to display the eco-mark 56. In other words, a driver can realize that the driver is performing fuel saving driving when the driver recognizes the virtual image of the eco-mark 56. The display controller 30 turns on the fourth light emitting element 44 when the eco-mark 56 is not displayed. That is, the second meter 36 is entirely illuminated when the eco-mark 56 is not displayed.

In the attention attracting mode, the vehicle surrounding information and the navigation information are displayed. Specifically, the display controller 30 controls the image output device 26 to display the recorded image 58 of a front side in the travelling direction, which was recorded by the surveillance camera, a designating image 60 indicating another vehicle detected by the detection sensor, the guide information 48 (in this case, the guidance 48) and the road information 62 (in this case, a regulation speed image 62).

The display controller 30 controls the recorded image 58 to be displayed on the first layer A and controls the designating image 60, the guide information 48 and the road information 62 to be displayed on the second layer B. The virtual image of the recorded image 58 is displayed between the first meter 34 and the second meter 36. The virtual images of the designating image 60, the guide information 48 and the road information 62 are displayed to overlap with the virtual image of the recorded image 58 in the front-rear direction. That is, the designating image 60 and the regulation speed image 62, which are involved with safety matter, have high priority for a user, and thus the virtual images of these images are displayed in front of the virtual image of the recorded image 58. It should be noted that the designating image 60 moves to follow the other vehicle displayed in the recorded image 58.

In the attention attracting mode, when attracting the attention of a user (i.e., a driver) is required, the display controller 30 is set to automatically change the layer to be displayed. In the present embodiment, when a distance from the other vehicle is shorter than a specified distance or when a case where the current travelling speed exceeds a limited speed, attracting the attention is required. The above specified distance may be adjusted according to the travelling speed, and when the travelling speed is 80 km/h, the specified distance from the other vehicle may be set to 60 m.

The display controller 30 switches the layer for displaying the designating image 60 from the second layer B to the third layer C when the distance from the other vehicle becomes shorter than the specified distance. Thus, when the distance from the other vehicle becomes short, the virtual image of the designating image 60 is displayed at a more front side, thereby attracting the attention of the user (the driver).

Furthermore, the display controller 30 switches the layer for displaying the road information 62 from the second layer B to the third layer C. That is, the user (the driver) is warned that the travelling speed exceeds the regulation speed by displaying the regulation speed image 62 at a more front side.

The effects and the operation of the vehicle display device 10 having the above-described configuration according to the present embodiment will be described.

For example, when a user manipulates the operation member 22 and selected the normal mode, the selection information from the operation member 22 is input into the display controller 30, and then the display controller 30 turns off the second light emitting element 40 and the fourth light emitting element 44. At the same time, the display controller 30 controls the image output device 26 to overlappedly display images having contents corresponding to the normal mode.

The image output device 26 displays the map information 46 on the first layer A and displays the guide information 48, the fuel consumption information 52 and the shift position 50 on the second layer B. The images displayed by the image output device 26 are reflected by the half-silvered mirror 28. Then, as shown in FIG. 5, the virtual image of the image output device 26 is displayed in front of the combination meter 24.

That is, the virtual image of the map information 46 on the first layer A is displayed at the same position as the first meter 34 and the second meter 36 in the front-rear direction. The virtual images of the guide information 48, the fuel consumption information 52 and the shift position 50 on the second layer B are displayed such that the virtual images project from the first meter 34 and the second meter 36 toward a front side. In this way, information, such as the guide information 48 and the driving information 50, 52 which have high priority for a user, is displayed so as to project from the map information 46. Therefore, the user can intuitively recognize the material information among a variety of information displayed by the vehicle display device 10.

Furthermore, since the guide information 48 is displayed in front of the map information 46, the virtual image of the guide information 48 can be clearly displayed as compared to a case where the virtual image of the guide information 48 is displayed at the same position as the map information 46 in the front-rear direction. Thus, the user can surely recognize the guide information 48 and properly follow the direction by the navigation.

As described above, in the normal mode, the virtual images of the map information 46, the guide information 48, or the like are stereoscopically displayed to overlap with the analog-type first and second meters 34, 36. Thus, a display performance with enhanced effects can be provided.

In this case, the second light emitting element 40 and the fourth light emitting element 44 are off. Thus, the portions of the first meter 34 and the second meter 36, with which the virtual images overlap, become relatively dark. Thus, the portions of the first meter 34 and the second meter 36 with which the virtual images overlap are made hard to be seen from a user. As a result, the user can clearly recognize the virtual images of the fuel consumption information 52, which overlaps with the first meter 34, and the shift position 50, which overlaps with the second meter 36.

When a user manipulates the operation member 22 and selects the sport mode, the display controller 30 controls, upon receiving the selection information of the sport mode, the image output device 26 to change the contents to be displayed. The display controller 30 further switches the displaying manner by the image output device 26 from the overlapped display to the 3-D display. When switched to the sport mode, the display controller 30 maintains the second light emitting element 40 and the fourth light emitting element 44 to be off.

In the sport mode, the tachometer image 54 of the revolution speed and the shift position 50 are stereoscopically displayed by the image output device 26. The 3-D images displayed by the image output device 26 are reflected by the half-silvered mirror 28. Then, the virtual images are stereoscopically displayed in front of the first meter 34 and the second meter 36. That is, as shown in FIG. 5, the virtual images of the tachometer image 54 and the shift position 50 are displayed to be upwardly inclined from a front side to a rear side. Since the lively 3-D images are displayed in the sport mode in this way, a user can enjoy driving the vehicle.

In the sport mode, the second light emitting element 40 and the fourth light emitting element 44 are also off. Thus, the portions of the virtual image of the tachometer image 54 overlapping with the first meter 34 and the second meter 36 can be clearly displayed.

Next, when the user switches the display mode to the economy mode, the display controller 30 switches the displaying manner by the image output device 26 to the overlapped display and changes the images to be displayed by the image output device 26.

In the economy mode, the fuel consumption information 52 is correlated with the first layer A and the eco-mark 56 is correlated with the second layer B. When the display controller 30 determines that current drive is the fuel saving driving condition, the display controller 30 turns off the second light emitting element 40 and the fourth light emitting element 44, and controls the image output device 26 to display the fuel consumption information 52 and the eco-mark 56.

The images displayed by the image output device 26 are reflected by the half-silvered mirror 28, and the virtual images are displayed in front of the first meter 34 and the second meter 36. That is, as shown in FIG. 5, the virtual image of the fuel consumption information 52 is displayed to overlap with the first meter 34 and the virtual image of the eco-mark 56 is displayed between the first meter 34 and the second meter 36. As a result, a user can recognize that current drive is the fuel saving driving condition.

The eco-mark 56 correlated with the second layer B is displayed in front of the first meter 34, the second meter 36 and the fuel consumption information 52. Thus, since the eco-mark 56 having high priority for a user is displayed to project toward a front side, the user can rapidly recognize the eco-mark 56.

Next, if the driving condition of the vehicle is changed and fuel economy deteriorates, the display controller 30 controls the image output device 26 not to display the eco-mark 56 and turns on the fourth light emitting element 44. Thus, the virtual image of the eco-mark 56 disappears while the second meter 36 is entirely illuminated.

As described above, if fuel economy deteriorates in this way, the display controller 30 causes the virtual image of the eco-mark 56 to disappear, and thus the user can recognize that the current driving is not the fuel saving driving condition. As a result, the user can keep in mind the fuel saving drive by changing the current driving manner. Furthermore, since the fourth light emitting element 44 is turned on upon eliminating the eco-mark 56, the entire second meter 36 appears. Thus, it is possible to prevent a situation where, when the eco-mark 56 disappears, a portion of the second meter 36, with which the eco-mark 56 overlaps, is darkly displayed, causing a user to feel strange.

Next, a case where a user switches the display mode to the attention attracting mode will be described. Hereinafter, a case where another vehicle is driving in front of the vehicle is assumed. The regulation speed for a road on which the vehicle is driving is 80 km/h. The display controller 30 changes the images to be displayed by the image output device 26 and turns off the second light emitting element 40 and the fourth light emitting element 44.

In the attention attracting mode, the display controller 30 correlates the recorded image 58 with the first layer A, and correlates the designating image 60 indicating (rocking) the other vehicle, the guide information 48 and the road information 62 (the regulation speed image) with the second layer B. When these images are displayed by the image output device 26, the virtual images reflected by the half-silvered mirror 28 are displayed in front of the first meter 34 and the second meter 36.

As a result, the virtual image of the recorded image 58 is displayed between the first meter 34 and the second meter 36. The virtual images of the designating image 60, the guide information 48 and the road information 62 are displayed in front of the virtual image of the recorded image 58 to overlap with the virtual image of the recorded image 58.

As described above, in the attracting attention mode, the designating image 60 and the regulation speed image 62, which are related to safety, are displayed at the foremost position. Thus, a user can intuitively recognize the high priority information. Further, since the recorded image 58 actually recorded by the surveillance camera is displayed, the use can recognize accurate information based on the real images. In the attracting attention mode, the portions of the first meter 34 and the second meter 36, with which the virtual images of the recorded image 58 and so on overlap, are darkly displayed. Thus, a user can clearly recognize the virtual images of the recorded image 58 and so on.

When a distance from the other vehicle becomes shorter than the specified distance (e.g., 60 m), the display controller 30 switches the layer for displaying the designating image 60 from the second layer B to the third layer C. As a result, the virtual image of the designating image 60 is displayed at a more front side, whereby the user can recognize that the distance is decreasing. In this way, the designating image 60 is displayed at a position close to the user, whereby the user can instinctively recognize the decrease in the distance. Hence, the user can rapidly perceive the danger and take an immediate action such as an action to decelerate the travelling speed of the vehicle.

Next, when the travelling speed of the vehicle exceeds 80 km/h, the display controller 30 switches the layer for displaying the regulation speed image 62 from the second layer B to the third layer C. As a result, the virtual image of the regulation speed image 62 is displayed at a more front side. Thus, a user can rapidly recognize that the travelling speed exceeds 80 km/h.

As described above, since the displaying manner visually varies during the attracting attention mode when the distance becomes small or the travelling speed exceeds the regulation speed, attracting the attention of the user or warning the user can be effectively performed.

It should be noted that the order of switching the display mode may be not only limited to the above-described order, but the order can be freely switched (refer to the arrows in FIG. 5). For example, it may be possible to switch from the sport mode to the attracting attention mode, or switch from the normal mode to the economy mode.

When the image output device 26 does not display an image, the display controller 30 turns on all first to fourth light emitting elements 38, 40, 42, 44. As a result, the first meter 34 and the second meter 36 are entirely illuminated as shown in FIG. 3, and thus a user can visually recognize the entire meters 34, 36.

The present disclosure is not only limited to the above-described embodiment but may be modified as below.

(1) In the embodiment, when an image is displayed by the image output device 26, the second light emitting element 40 and the fourth light emitting element 44 are turned off. However, the second light emitting element 40 and the fourth light emitting element 44 may not necessarily be turned off, as far as the portions of the first meter 34 and the second meter 36, with which the virtual image of the image output device 26, becomes relatively dark. For example, the light emission behavior of the second light emitting element 40 and the fourth light emitting element 44 may be controlled such that the brightness of the second light emitting element 40 and the fourth light emitting element 44 is less than that of the first light emitting element 38 and the third light emitting element 42.

In the above embodiment, the combination meter 24 including the analog-type first and second meters 34, 36 is used. However, other configuration other than the analog type may be used as the display member according to the present disclosure, as far as the display portion is two-dimensionally displayed. For example, a TFT meter, which displays an image of a tachometer (display portion), may be used as the display member. In this case, the controller controls the TFT meter such that a portion thereof, with which a virtual image overlaps, becomes relatively dark.

(2) In the above embodiment, the display mode is selected when a user manipulates the operation member 22. However, in a vehicle where a variety of driving modes can be selected, the display mode may be automatically switched in association with the selected driving mode. For example, when an economy driving mode where fuel saving drive is executed is selected, the display controller 30 may automatically switch the display mode to the economy mode. Further, when a sport driving mode where an engine performance is improved is selected, the display controller 30 may automatically switch the display mode to the sport mode.

In this way, the display mode is automatically switched in association with the driving mode, the vehicle display device can display an image associated with the driving mode. Further, it is possible to save user's trouble when selecting the display mode.

(3) The attracting attention mode in the above embodiment is executed when a user selects the attracting attention mode. However, the attracting attention mode may be forcibly executed when attracting the attention is required.

For example, when the normal mode is selected, and when a distance from a front travelling vehicle is shorter than the specified distance, the display controller 30 may forcibly switch the display mode from the normal mode to the attracting attention mode. Then, the display controller 30 associates the designating image 60 with the third layer C and causes the virtual image of the designating image 60 at the foremost position. Thus, even when the normal mode is selected, a user can recognize that the distance from the front travelling vehicle is small.

Furthermore, when the sport mode is selected and when the travelling speed of the vehicle exceeds a regulation speed, the display controller 30 may also forcibly switch the display mode from the sport mode to the attracting attention mode. Furthermore, the display controller 30 may correlate the regulation speed image 62 with the third layer C and display the virtual image of the regulation speed image 62 at the foremost position. As a result, a user can recognize the over speed even when the sport mode is selected.

(4) In the attracting attention mode in the above embodiment, when attracting the attention is required, the designating image 60, the regulation speed image 62 or the like are switched from the second layer B to the third layer C. In addition to this, the designating image 60 and/or the regulation speed image 62 may blink or warning sound may be generated. Accordingly, it is possible to effectively attract the attention of a user or warn the user.

In a case where a detection signal of braking is input to the display controller 30, attracting the attention as to a distance may be performed only when the detection signal of braking is not input to the display controller 30. In other words, attracting the attention as to the distance may not be executed while braking is being performed. Further, the designating image 60 may be back to the second layer B from the third layer C when the detection signal of braking is input to the display controller 30 while attracting the attention as to the distance.

Furthermore, when attracting the attention as to over speed is executed and when the detection signal of braking is input to the display controller 30 or when the travelling speed falls below a regulation speed, the layer for displaying the regulation speed image 62 may be back to the second layer B from the third layer C.

(5) In the economy mode of the above embodiment, the eco-mark 56 is displayed during the fuel saving driving and disappears during non-fuel saving driving. However, the eco-mark 56 may be displayed in a green color during the fuel saving driving condition and may be displayed in an orange color during the non-fuel saving driving condition. In this case, a user can determines whether the fuel saving drive is performed based on the color of the eco-mark 56.

(6) In the above embodiment, a user can select the display mode. In addition to this, a user may voluntarily switch the layer for displaying an image. For example, in the normal mode, the layer for displaying the map information 46 may be switched from the first layer A to the second layer B, or in the economy mode, the fuel consumption information 52 may be switched from the first layer A to the second layer B. Further, a user may change contents of an image to be displayed in each display mode.

Furthermore, a user may determine whether the image output device 26 performs the 3-D display or the overlapped display. For example, in the sport mode, the tachometer image 54 and the shift position 50 may be switched from the 3-D display to the overlapped display (e.g., displayed on the second layer B). Further, in the sport mode, only the shift position 50 may be overlappedly displayed (e.g., displayed on the second layer B).

(7) In the above embodiment, the virtual image of the image output device 26 is displayed between the first meter 34 and the second meter 36. However, the virtual image of the image output device 26 may be displayed anywhere as far as the virtual image is displayed in front of the combination meter 24. Also, a region where the virtual images of the image output device 26 may be changed. In other words, the display pattern by the vehicle display device according to the present disclosure may be not only limited to the above embodiment and may be changed.

For example, a virtual image having the same size as the board surface of the combination meter 24 may be displayed, or a virtual image of the number indicating the traveling speed may be displayed on the first meter 34. Furthermore, when a fuel remaining amount is low, a virtual image of a route to a neighboring gas station or a travelable distance may be displayed on a portion close to the fuel meter in the second meter 36.

In the above embodiment, the overlapped display is performed with three layers, but the overlapped display may be performed with one or two layers or with four or more layers. Furthermore, the image output device 26 is disposed on the top surface 16*a* of the storage chamber 16 but the image output device 26 may be disposed on a bottom surface of the storage chamber 16. Furthermore, the directions in which the half-silvered mirror 28 and the combination meter 24 face may not form a right angle.

In the above embodiment, the display controller totally controls the vehicle display device but, for example, the control to the image output device 26 and the control to the first to the fourth light emitting elements 38, 40, 42, 44 may be separately performed by different controllers. Further, the function to control an image displayed by the image output device 26 may be included in the image output device 26.

In the above embodiment, the combination meter 34 is arranged so as to face along the horizontal direction, but, for example, the combination meter 34 may be inclined downward or upward. Furthermore, the location where the vehicle display device is arranged may be not limited to the above embodiment and may be changed.

In the above embodiment, the vehicle display device 10 is applied to the hybrid vehicle but the vehicle display device according to the present disclosure may be applied to any other vehicles such as gasoline cars or EVs.

What is claimed is:

1. A vehicle display device comprising:
    a combination meter including a display meter visible from a front side along a front-rear direction of the combination meter;
    a reflecting member disposed in front of the display meter and having semi-transparent property;
    an image output device configured to display a virtual image in front of the combination meter along the front-rear direction by outputting an image toward the reflecting member,
    a first light emitting element and a second light emitting element disposed behind the combination meter along the front-rear direction; and
    a controller programmed to control light emission behavior of the first light emitting element and the second light emitting element, wherein
    the display meter includes
        a first meter region which overlaps with the first light emitting element and the virtual image in the front-rear direction, and
        a second meter region which overlaps with the second light emitting element in the front-rear direction and which does not overlap with the virtual image in the front-rear direction, and
    the controller is programmed to control the first light emitting element to emit light at a lower brightness level than the second light emitting element when the image output device displays the virtual image.

2. The vehicle display device according to claim 1, wherein:
    the image output device is a 3-D display device that displays a 3-D image.

3. The vehicle display device according to claim 2, wherein
    the image output device displays the image on a plurality of layers that are positioned different from each other, and
    the virtual image of each of the plurality of layers, which is reflected by the reflecting member, is displayed to be positioned different from each other in the front-rear direction.

4. The vehicle display device according to claim 3, wherein
    the image output device displays the image having different contents on each of the plurality of layers.

5. The vehicle display device according to claim 4, wherein
    the image output device displays an image related to a warning on one of the plurality of layers, which is positioned at a foremost position after being reflected by the reflecting member.

6. A vehicle display device comprising:
    a combination meter including a display meter visible from a front side along a front-rear direction of the combination meter;
    a reflecting member disposed in front of the display meter and having semi-transparent property;
    an image output device configured to display a virtual image in front of the combination meter along the front-rear direction by outputting an image toward the reflecting member,
    a first light emitting element and a second light emitting element disposed behind the combination meter along the front-rear direction; and a controlling programmed to control light emission behavior of the first light emitting element and the second light emitting element, wherein the display meter includes
- a first meter region which overlaps with the first light emitting element and the virtual image in the front-rear direction, and
- a second meter region which overlaps with the second light emitting element in the front-rear direction and which does not overlap with the virtual image in the front-rear direction, the controller is programmed to control the first light emitting element to emit light at a lower brightness level than the second light emitting element when the image output device displays the virtual image, and the image output device is a 3-D display device that displays a 3-D image.

\* \* \* \* \*